W. S. KENNEDY.
MOTOR DERRICK SLEIGH FOR LOADING LOGS.
APPLICATION FILED MAY 31, 1910.

980,791.

Patented Jan. 3, 1911.

5 SHEETS—SHEET 2.

W. S. KENNEDY.
MOTOR DERRICK SLEIGH FOR LOADING LOGS.
APPLICATION FILED MAY 31, 1910.
980,791.
Patented Jan. 3, 1911.
5 SHEETS—SHEET 3.
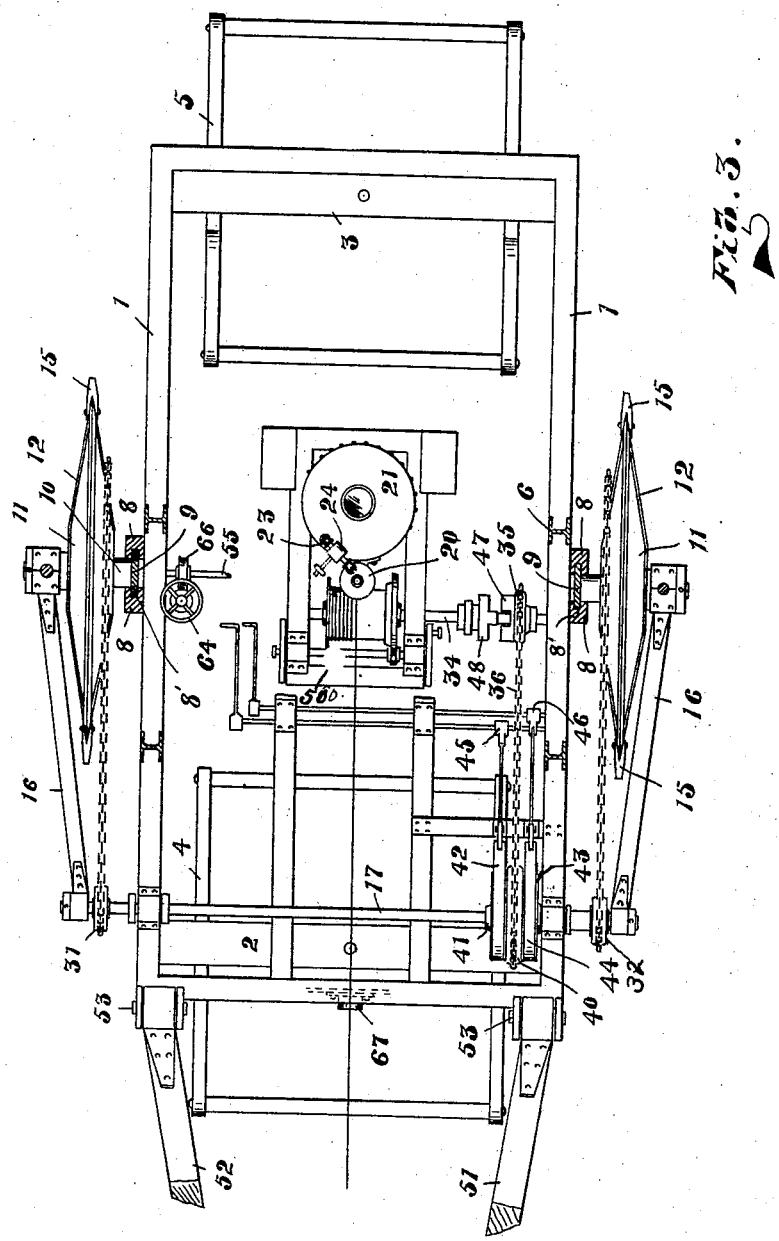
WITNESSES
INVENTOR
BY
ATTORNEY.

W. S. KENNEDY.
MOTOR DERRICK SLEIGH FOR LOADING LOGS.
APPLICATION FILED MAY 31, 1910.
980,791.
Patented Jan. 3, 1911.
5 SHEETS—SHEET 4.
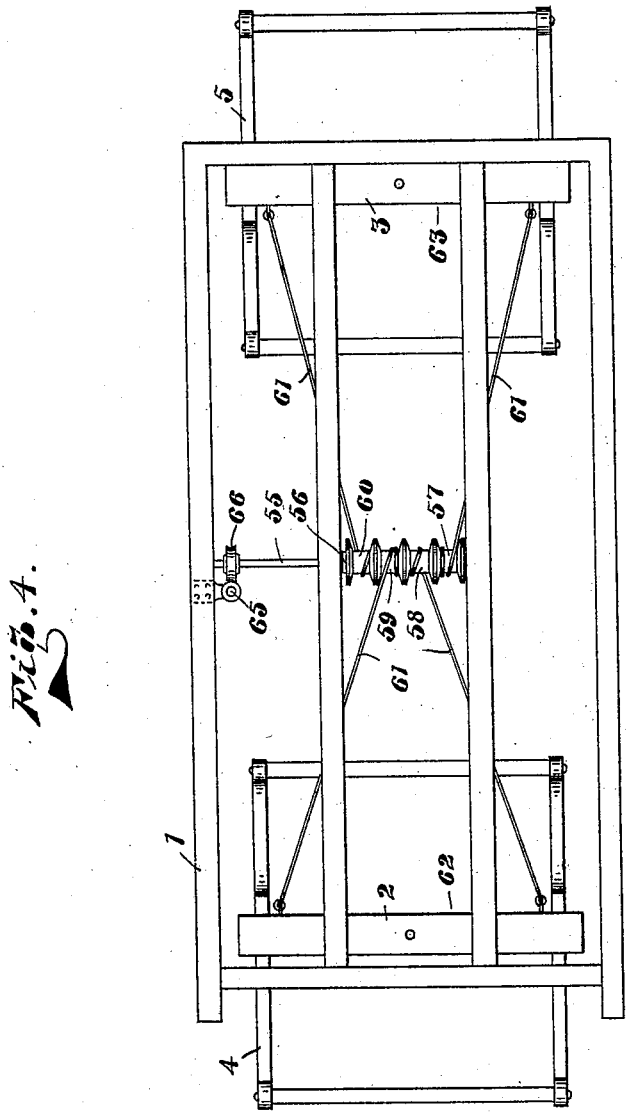

W. S. KENNEDY.
MOTOR DERRICK SLEIGH FOR LOADING LOGS.
APPLICATION FILED MAY 31, 1910.
980,791.
Patented Jan. 3, 1911.
5 SHEETS—SHEET 5.
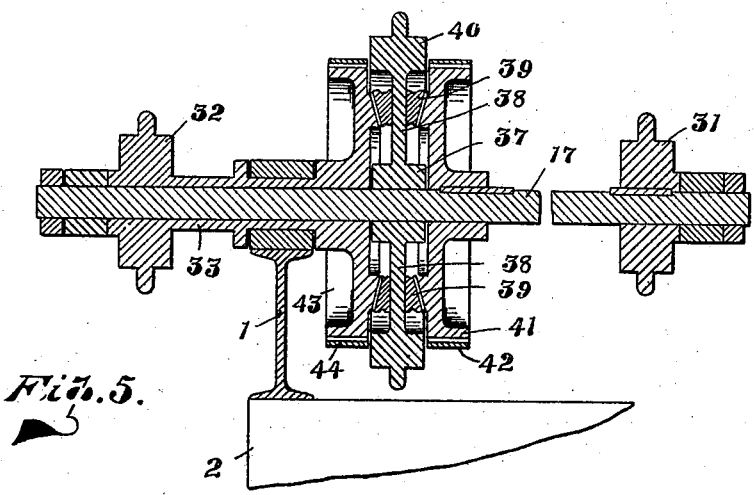
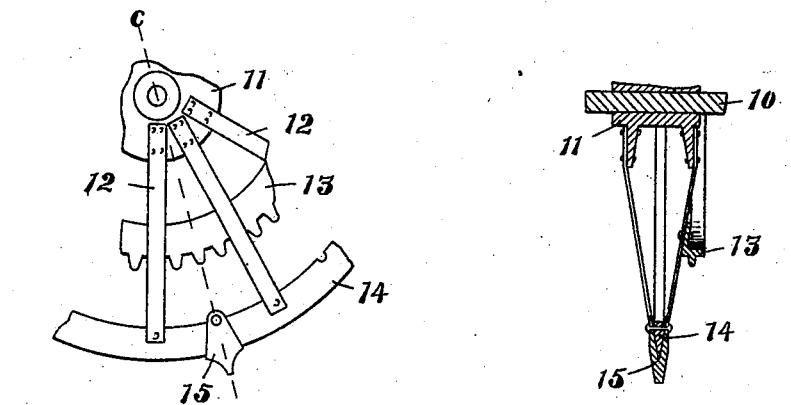
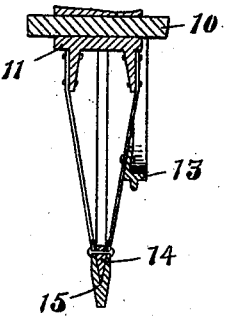
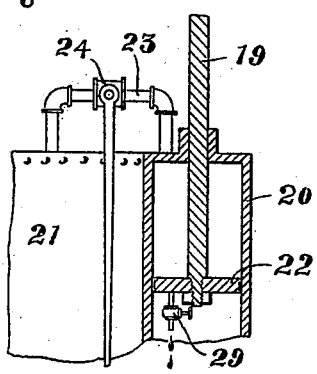
WITNESSES
INVENTOR
W. S. Kennedy
BY
A. S. Pattison
ATTORNEY

UNITED STATES PATENT OFFICE.

WALTER S. KENNEDY, OF DULUTH, MINNESOTA.

MOTOR DERRICK-SLEIGH FOR LOADING LOGS.

980,791.      Specification of Letters Patent.      Patented Jan. 3, 1911.

Application filed May 31, 1910. Serial No. 564,321.

*To all whom it may concern:*

Be it known that I, WALTER S. KENNEDY, a citizen of the United States, residing at Duluth, in the county of St. Louis and State of Minnesota, have invented certain new and useful Improvements in Motor Derrick-Sleighs for Loading Logs, of which the following is a specification, reference being had therein to the accompanying drawing.

My invention relates to improvements in motor derrick sleighs for loading logs.

The object of my invention is to provide a log loader of this character mounted upon a sleigh and in which is provided a power derrick, and the same power also utilized for propelling the sleigh around as is desired.

Another object of my invention is to provide a motor sleigh which can be readily operated over very rough ground and one which will automatically adjust itself to the varying conditions to which a sleigh of this character is put.

Another object of my invention is to provide a motor derrick sleigh of more simple structure and operation, and one having as wide range of usefulness as possible.

Figure 1:
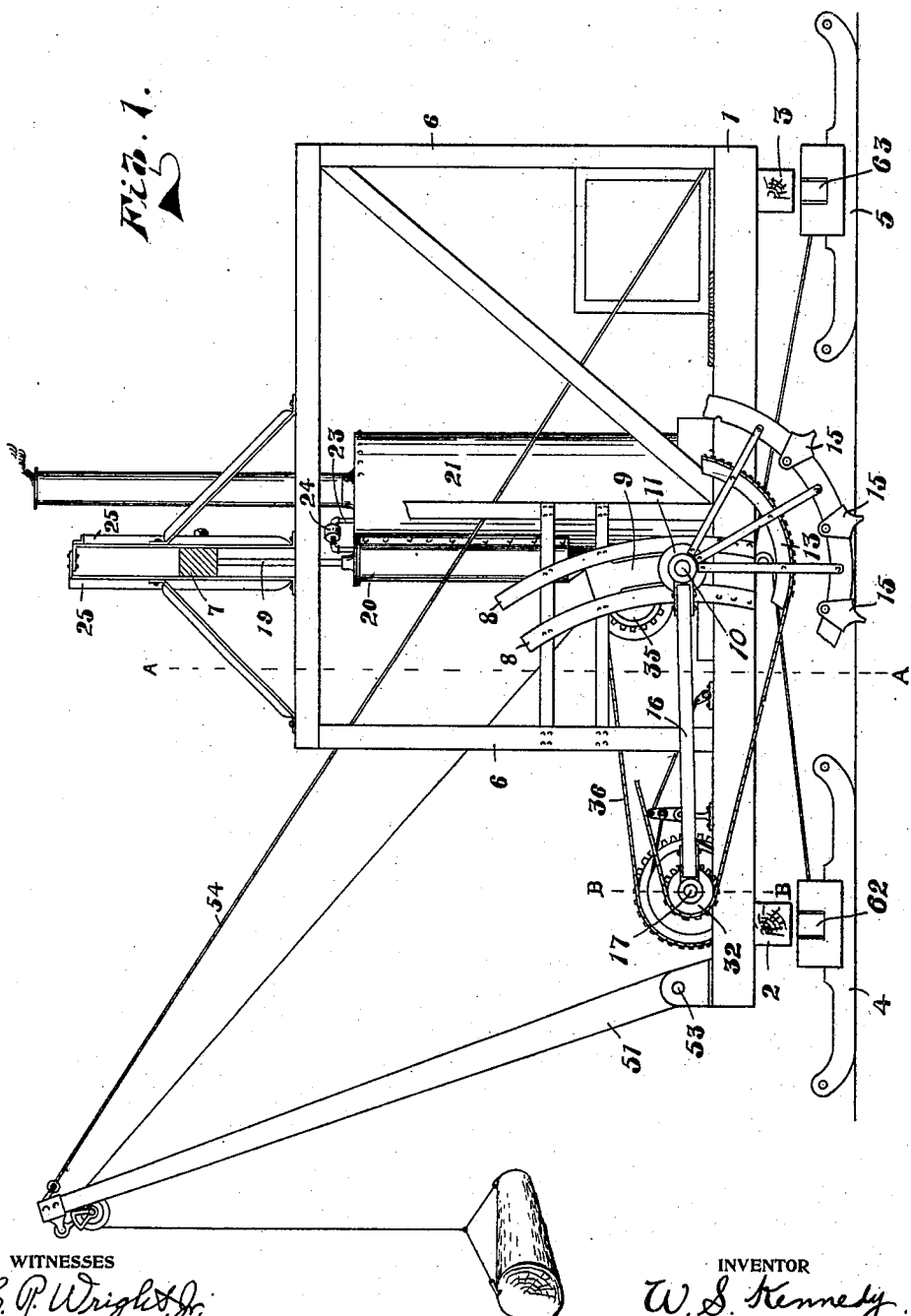
Figure 2:
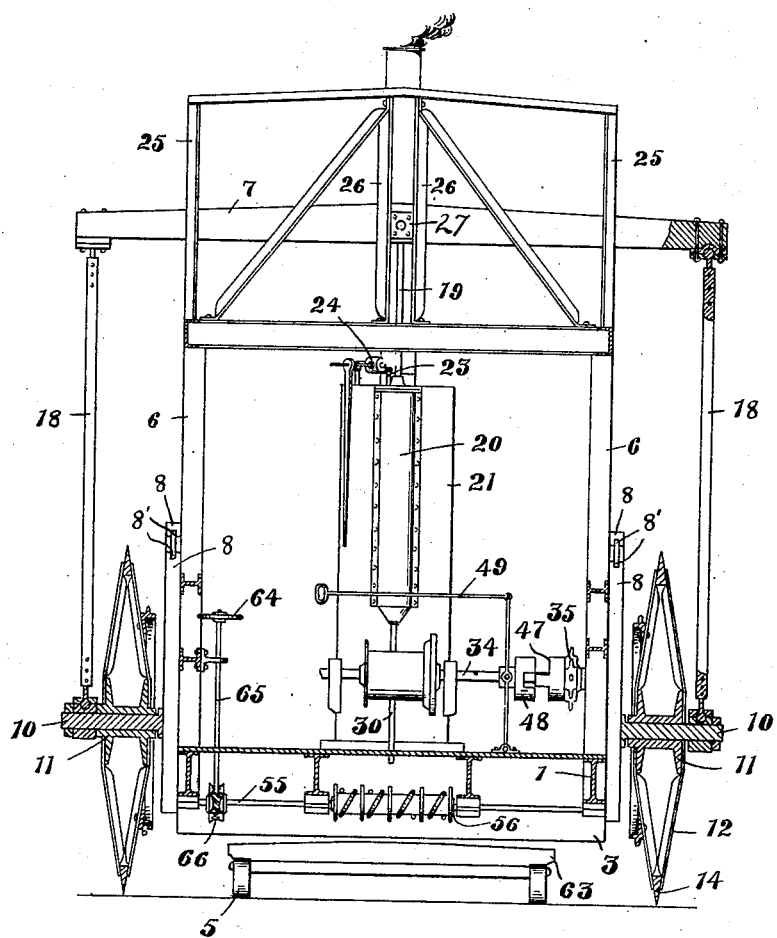

In the accompanying drawing—Figure 1 is a side view partly broken away of my improved loader. Fig. 2 is a vertical section taken on the line A—A Fig. 1, showing the traction wheels in section. Fig. 3 is a plan view partly in section. Fig. 4 is a plan view of the steering gear. Fig. 5 is a vertical cross-section of the differential gear taken on the line B—B, Fig. 1. Fig. 6 is a side segmental view of one of the traction wheels. Fig. 7 is a cross-sectional view on the line C—C, Fig. 6. Fig. 8 is a cross-sectional view of the upper end of the traction cylinder showing its connection to the boiler et cetera.

Referring now to the drawings, 1 represents a strong rectangular shaped frame preferably constructed of metal, securely mounted upon the cross-bunks 2 and 3, which in turn are pivotally mounted upon the double-ended sleigh bobs 4 and 5.

Upon the frame 1 is securely braced and mounted a superstructure frame 6, and upon the superstructure are mounted suitable vertical leads for the traction beam 7. 8—8 are segmental shaped leads securely bolted to the sides of the superstructure 6 and within which vertically operate the cross-heads 9—9, carrying skeins 10—10 upon which are mounted the sprocket chain driven traction wheels 11—11. These wheels are preferably built up of angle bars 12 supporting the sprocket rim 13, and the V-shaped tire or rim 14, this latter being made V-shaped to readily cut through the snow or soft road bed, and to prevent slipping of the traction wheels, I provide suitable detachable dogs 15, which fit over the rim 14 between the spokes 12 and are securely bolted thereto. The dogs 15, project beyond the rim 14 and being wider in cross-section as clearly shown in Figs. 6 and 7, prevent any possibility of the wheels slipping and thus insures the tractive power thereof.

The skein 10 of each wheel is held in position laterally by means of the brace 16, pivotally mounted upon the outer end of the counter shaft 17, and attached to the outer end of the skein, and is supported vertically by the braces 18, also attached to the outer end of the skein and at its opposite end to the end of the traction beam 7. These two connections both at the ends of the beam and ends of the skeins are designed to be of as flexible a construction as possible for which purpose I have shown a ball and socket though it is understood that there are several other forms of construction that might be used with equally good results. Thus it is seen that the traction wheels are suspended from the beam 7 and are capable of vertical adjustment thereby, the cross-heads 9—9 operating within suitable grooves 8' within the leads 8. The vertical adjustment of the beam 7 is accomplished by means of the centrally pivoted piston rod 19 operating within the steam cylinder 20 securely attached to the boiler 21, which latter provides the steam power both for the operating engines (not shown) and the power for actuating the piston 22 within the cylinder 20. Steam is fed from the boiler 21 to the upper end of the cylinder 20, through a suitable pipe connection 23 having installed therein a hand operative valve or throttle 24, which is arranged conveniently accessible to the operator. By this arrangement steam can be admitted to the cylinder 20 above the piston 22 which will have a tendency to force the latter downward drawing the beam 7 with it and thus apply tractive pressure to the wheels 11 and increase their efficiency as desired. Under ordinary circumstances it is considered that the natural gravity of the wheels and their attachment will be sufficient for ordinary operation.

The vertical leads 25 are so positioned as to prevent any undue lateral movement of the beam 7, and the central leads 26 guide the block 27, which is pivotally attached to the side beams 7, thus preventing longitudinal movement of the beam.

The piston 22 within the cylinder 20 is provided with a drain-cock 29, which is designed to be left slightly open at all times to allow all condensed steam to escape and thereby prevent any possibility of freezing and the escaped water will drain down and out through the waste pipe 30. The counter-shaft 17 extends entirely across the frame 1 and carries at one end the sprocket wheel 31, which is securely keyed thereto and which drives one of the traction wheels 11, while at the opposite end is mounted the sprocket wheel 32, which drives the other traction wheel 11, and is loosely mounted upon the counter shaft 17, it being integral with the sleeve 33, in which the shaft 17 revolves.

The differential gear which receives power from the drum shaft 34, through a suitable sprocket 35 and chain 36 is composed of the hub member 37 loosely mounted upon the shaft 17 and having a plurality of radial arms 38, carrying beveled gears 39, and terminating in the sprocket rim 40 upon which the chain 36 operates and imparts power. On the inner side of the hub 37 and keyed to the shaft 17 is the band-brake wheel 41, having an inner beveled gear face meshing with the gears 39 and driven thereby, this wheel being surrounded and controlled by a suitable band-brake 42. On the opposite side of the hub 37 and formed integral with the sleeve 33 is the band-brake wheel 43, it also having a beveled geared inner face meshing with the gears 39 and through which power is transmitted to the sprocket 32 and from thence to the other one of the traction wheels 11. The brake wheel 43 is also provided with a suitable band-brake 44, similar to the brake 42, these brakes being operated by the bell-cranks 45 and 46, mounted upon suitable shafts leading within convenient reach of the operator where they may be actuated either by hand or foot power as is preferred in such practice. As power is applied to the sprocket 40, it will carry about with it the radial arms supporting the gears 39, and they in turn will revolve either one or both of the brake wheels 41 and 43, according as the band-brakes may be applied or released, or in the event of both brakes being released the brake wheels will be free to differentiate in speed as to the tractive requirements of the wheels 11, as for instance rounding a curve, one wheel will be free to travel faster than the other without any special adjustment of the power.

The driving sprocket wheel 35 is loosely mounted upon the drum shaft 34, and is formed with a clutch face 47, which engages the sliding clutch member 48, which is feathered on the drum-shaft and operated by a lever 49, conveniently located for the operator. The drum-shaft is designed to be driven continuously from the engine shaft 50, as is well known and in common practice. The hoisting boom or derrick is composed of the braces 51 and 52 pivotally mounted at their lower ends 53 to the forward corners of the frame 1, and the metal rods or guy-lines 54 reaching from the outer end of the boom to the rear corners of the frame 1 are designed to retain the boom in position.

The usual hoisting pulleys and ropes are suspended from the outer end of the boom and operated from the drum which may be located as shown or placed in any convenient position.

The steering of my improved motor sleigh is accomplished by means of the hand-operated shaft 55, mounted upon the under side of the frame 1 and carrying the drum 56 divided into four spools 57, 58, 59 and 60, upon which are wound the steering lines 61, leading from the forward sleigh beam 62 to the inner spools 58 and 59, and those from the rear sleigh beam 63 to the outermost spools 57 and 60. The two lines from the same side of the sleigh lead around the spools in opposite directions so that they pull exactly opposite when the shaft 55 is revolved, thus swinging the bobs in opposite directions which accomplishes the desired results in turning. The shaft 55 is controlled and operated by the hand wheel 64, mounted upon the vertical shaft 65 through the worm gear 66, the hand wheel being located in a convenient position to be manipulated by the operator.

Centrally located on the forward end of the frame 1 is bolted a somewhat convexed small casting 67 against which a pole or scantling may be placed for bumping or starting a loaded sleigh ahead of the loader as the loaded sleighs are very apt to stick and become fixed in the snow and require a sudden bump or jar to loosen them, and my improved sleigh having its own motive power can readily give such a bump.

Having thus described my invention, what I claim and desire to secure by Letters Patent is—

1. A motor derrick sleigh, comprising a frame mounted upon the bob-sleighs, a derrick carried by the frame, means carried by the frame for operating the derrick, and said means operating an adjustable propeller for driving the sleigh.

2. A motor derrick sleigh, comprising a frame mounted upon runners, a derrick carried by the frame, means carried by the frame for operating the derrick, a propeller for driving the sleigh and operated by the derrick operating means, and means whereby the propeller can adjust itself to the unevenness of the ground.

3. A motor derrick sleigh, comprising a frame mounted upon runners, a derrick carried by the frame, means carried by the frame for operating the derrick, a propeller for driving the sleigh and operated by the derrick operating means, and means for raising the propeller for the purpose described.

4. A motor derrick sleigh, comprising a frame mounted upon runners, a derrick carried by the frame, means for operating the derrick, a propeller wheel for driving the sleigh and operated by the derrick operating means, and means for moving the propeller vertically to increase the traction thereof.

5. A motor derrick sleigh, comprising a frame mounted upon runners, a derrick carried by the frame, a motor carried by the frame for operating the derrick, a propeller wheel for driving the sleigh and operated by the derrick operating motor, and means for moving the propeller downwardly for increasing the traction power thereof, and said means operated by the motor.

6. A motor derrick sleigh, comprising a frame mounted upon runners, a derrick carried by the frame, a steam engine for operating the derrick, a vertically movable propeller wheel for driving the sleigh, and operated by derrick operating means, a piston connected to said propeller wheel and adapted to move the same downwardly by pressure from the engine to increase the traction thereof.

7. A derrick sleigh, comprising a frame mounted upon runners, a derrick mounted upon said frame, an engine operating the derrick, vertically movable propelling wheels carried by the frame for driving the sleigh, and operated by the engine, a piston and piston-rod connected to the propelling wheels and adapted to force the same downwardly by pressure from the engine to increase the traction power of the propelling wheels.

8. A derrick comprising a frame mounted upon runners, a derrick mounted upon said frame, means for operating said derrick, spindles vertically movably mounted in said frame, propelling wheels carried by the spindles, means for vertically moving said spindles and means for rotating said wheels.

9. A derrick comprising a frame, mounted upon runners, a derrick mounted upon said frame, an engine carried by the frame for operating said derrick, vertically movable spindles carried by the frame, propeller wheels carried by the spindles, means operated by the engine for forcing the spindles downwardly to increase the traction of the wheels and means operated by the engine for driving the wheels.

10. A derrick comprising a frame mounted upon runners, a derrick mounted upon the frame, an engine carried by the frame for operating the derrick, segmental tracks carried by the frame, spindles slidably mounted between said tracks, propelling wheels carried by the spindles, and means operated by the engine for moving the spindles vertically and rotating the wheels.

11. A derrick comprising a frame mounted upon runners, a derrick mounted upon the frame, an engine carried by the frame for operating the derrick, segmental tracks carried by the frame, spindles slidably mounted between said tracks, propeller wheels carried by the spindles, a shaft mounted on the frame, brace beams connecting the shaft and spindles, means carried by the engine for rotating said shaft, an endless drive member between the shaft and wheels, and means operated by the engine for moving the spindles downwardly for increasing the traction of the wheels carried thereby.

12. A derrick comprising a frame mounted upon runners, a derrick mounted upon the frame, segmental tracks carried by the frame, spindles slidably mounted between said tracks, propelling wheels carried by the spindles, and means carried by the frame for operating the derrick, rotating the wheels and moving the spindles vertically.

13. A derrick comprising a frame mounted upon runners, a derrick mounted upon the frame, segmental guides carried by the frame, spindles slidably mounted between said guides, propelling wheels carried by the spindles, a transverse beam above the spindles, rods connecting the spindles and the beam, a piston and piston rod connected to said beam, and an engine mounted on the frame and supplying steam to the piston, and means operated by the engine for rotating the wheels and operating the derricks.

14. A derrick comprising a frame mounted upon runners, a derrick carried by the frame, an engine mounted on the frame, a drum carried by the frame and driven by the engine, vertically movable propelling wheels carried by the frame, means carried by the drum mechanism for rotating the wheels, and means operated by the engine for moving said wheels vertically on the frame.

15. A derrick comprising a frame mounted upon runners, a derrick carried by the frame, an engine carried by the frame, a drum driven by the engine, means connecting the drum with the derrick, a shaft carried by the frame, a planetary gearing carried by the shaft, a drive chain connecting said gearing with the drum propelling wheels carried by the frame and drive chains connecting the wheels and the shaft.

16. A derrick comprising a frame mounted upon runners, a derrick carried thereby, an engine carried by the frame, means operated by the engine, for operating the derrick, segmental guides carried by the frame, spindles mounted in said frames, propelling wheels mounted upon the spindles, a shaft mounted in the frame, braces connecting the shaft and spindles, a transverse beam above the spindle rods having ball and socket connections with the spindles and the beam, a piston operated by the engine for moving the beam downwardly, a planetary gearing carried by the shaft, sprocket wheels carried by the shaft, chains connecting said sprockets with the propelling wheel, means carried by the planetary gear for driving one sprocket faster than the other, a chain driving the planetary gear and driven by the drum and a clutch for disconnecting the chain from the drum.

17. A motor derrick, comprising a frame, bob-sleighs pivotally connected to the frame, a derrick carried by the frame, propelling wheels mounted on the frame, means for operating said derrick and wheels, a transverse shaft carried by the frame, four drums carried by the shaft, cables wound upon said drums in opposite direction and connecting the bob-sleighs on opposite sides of the pivots, a worm gear carried by the shaft, a vertical shaft in the frame and having a hand wheel at its upper end, and a worm carried by the lower end of the shaft and meshing with the worm gear, substantially as described.

18. A motor derrick comprising a frame mounted upon runners, a derrick carried by the frame, a motor carried by the frame for operating the derrick, a propeller wheel for driving the sleigh and operated by the derrick operating motor and means for increasing the traction power of the propeller.

19. A motor derrick sleigh, comprising a frame mounted upon runners, a derrick carried by the frame, a steam engine for operating the derrick, a vertically movable propeller wheel for driving the sleigh and operated by the derrick operating means, and means connected to the propeller wheel for moving the same downwardly to increase the traction thereof.

20. A derrick sleigh, comprising a frame mounted upon runners, a derrick mounted upon said frame, an engine operating the derrick, propeller wheels carried by the frame for driving the sleigh and operated by the engine, a piston driven by the engine and connected to the propeller wheel, pushing the same downwardly to increase the traction power of the propeller wheels.

21. A derrick comprising a frame mounted upon runners, a derrick mounted upon said frame, means for operating said derrick, vertically movable propeller wheels carried by the frame, and means for vertically moving said propeller wheels and rotating the same.

22. A derrick comprising a frame mounted upon runners, a derrick mounted upon said frame, an engine carried by the frame for operating said derrick, vertically movable propeller wheels carried by the frame, a cylinder connected to the engine, a piston and piston-rod operated by pressure in the cylinder, means connecting the piston rod to the propeller wheels to increase the traction of the propeller wheels, means operated by the engine for driving the propeller wheels and a clutch mechanism for disconnecting the drive mechanism from the propeller wheels.

In testimony whereof I hereunto affix my signature in the presence of two witnesses.

WALTER S. KENNEDY.

Witnesses:
   NORMAN C. LANFORD,
   S. GEO. STEVENS.